Figure 1:
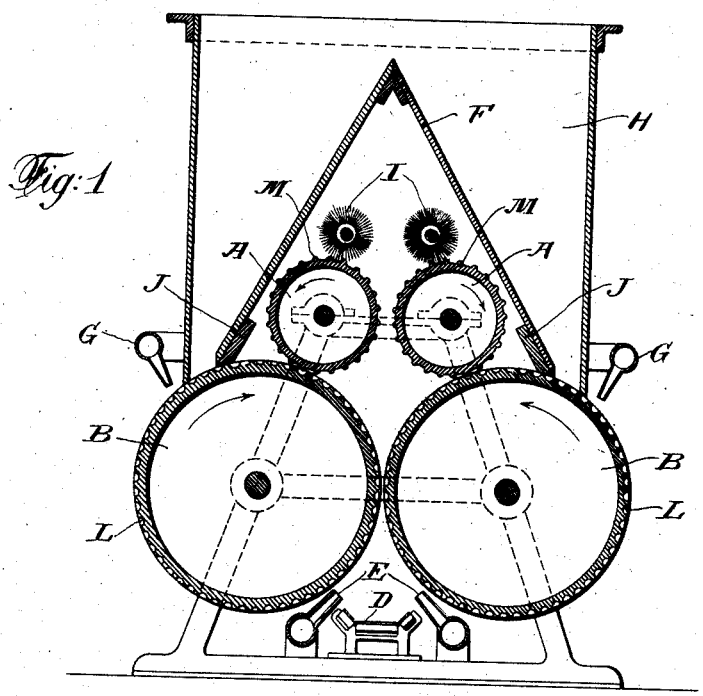
Figure 2:
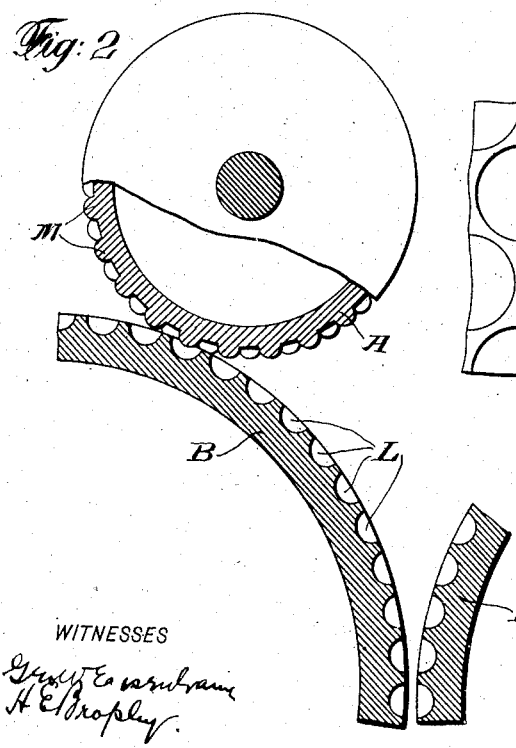
Figure 3:
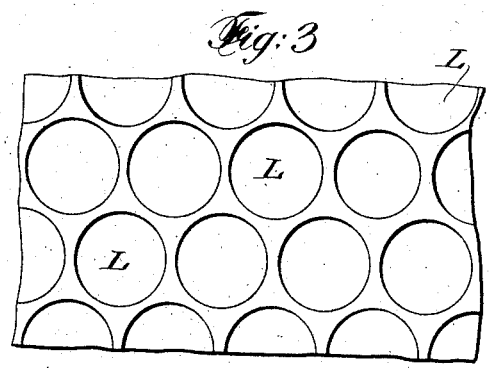

No. 874,167. PATENTED DEC. 17, 1907.
W. D. CROW.
MACHINE FOR MOLDING UNITS OF CLAY OR OTHER REFRACTORY MATERIAL
TO BE USED IN THE MANUFACTURE OF CONCRETE.
APPLICATION FILED MAR. 21, 1907.

WITNESSES

INVENTOR
William D. Crow
BY
Clarence S. Galston
ATTORNEY

UNITED STATES PATENT OFFICE.

WILLIAM D. CROW, OF EAST ORANGE, NEW JERSEY.

MACHINE FOR MOLDING UNITS OF CLAY OR OTHER REFRACTORY MATERIAL TO BE USED IN THE MANUFACTURE OF CONCRETE.

No. 874,167.      Specification of Letters Patent.      Patented Dec. 17, 1907.

Application filed March 21, 1907. Serial No. 363,588.

*To all whom it may concern:*

Be it known that I, WILLIAM D. CROW, a citizen of the United States, residing in the city of East Orange, county of Essex, State of New Jersey, have invented a Machine for Molding Units of Clay or other Refractory Material to be Used in the Manufacture of Concrete, of which the following is a specification.

The object of my invention is to produce hollow spherical bodies referred to in my application for Letters Patent filed in the United States Patent Office February 26th, 1907, Serial No. 359,508. A machine which is calculated to mold such hollow spherical bodies is shown in the hereinafter described mechanism which is also illustrated in the accompanying drawings.

Figure I is a transverse sectional elevation of the entire machine; Fig. II shows an enlarged sectional elevation of part of the cylinders B and A; Fig. III shows a broken surface of the cylinder B.

Similar letters refer to similar parts throughout the several views.

H is a hopper; F is a deflector of the clay or other material poured into the hopper; A are hollow cylinders with studs or projections M; B are hollow cylinders with depressions L on their exterior surface; J are scrapers for the purpose of scraping off the surplus material on the cylinders B.

I are revolving brushes; G are jets for the purpose of lubricating the cylinders B with oil or sand, or whatever other material is used.

D is a conveyer and E are dust jets.

It will thus be seen that the mechanism consists of two parallel and hollow cylinders B mounted on a frame support, which rotate on their axes and are set with their sides touching or nearly touching each other. The curved surfaces of these cylinders have depressions thereon of such size and shape that each depression forms half of a mold for a clay unit. The depressions are so arranged on the surfaces of the cylinders that each depression on one cylinder has a concurrent depression on the other cylinder at the line of contact of the cylinders, thus forming the two halves of a mold for a clay unit. The depressions L after being filled with clay are brought into concurrence by the rotation of the cylinders toward each other. The clay in each depression adheres to the clay in the opposite depression, thus forming a complete clay unit which is released by the further rotation of the cylinders and drops into the receptacle D placed underneath or on a belt or other conveyer.

The hopper, or hoppers, are placed above the cylinders B and open at the bottom so that clay placed in the hopper or hoppers is permitted to pass into the depressions on the cylinders.

The two cylinders A mounted on a frame support are also hollow and rotate on their axes and are set parallel with each other, and also parallel with the cylinders B. The studs or projections M are of such size and shape as may be suitable to the form of clay unit desired and are placed so that as the four cylinders rotate the studs or projections will be brought to concurrent positions with the depressions of the cylinders B and project a distance into such depressions L thus displacing some of the clay in the depression and forming in the clay half of a hollow which will be in the interior of each clay unit when it is complete.

When it is desired to make the solid spheres referred to in my application filed February 26, 1907, Serial No. 359,508, the cylinders A will be kept from operating so that solid clay units will be produced by the cylinders B.

Steam coils, gas burners or other heating apparatus may be placed in or adjacent to all of the four cylinders for the purpose of maintaining a temperature at which the clay will be prevented from adhering to the cylinders; or jets G for spraying oil may be used.

The brushes I are for the purpose of cleaning the cylinders A.

For the purpose of spraying the clay units with dust after they have been molded so that the clay units will not stick together, the jets E are provided.

Having thus described my invention, what I claim is:

1. A molding machine, consisting of two parallel cylinders, concurrent depressions in said cylinders, two other cylinders mounted above and parallel with the aforesaid cylinders and with each other, studs on the surface of said cylinders arranged so as to engage the depressions of said first pair of cylinders, a hopper arranged above all of said cylinders, a deflector in said hopper, scrapers arranged in said hopper to remove surplus material from the first of said pair of cylinders, lubricating jets mounted on said hopper, revolving brushes mounted above said second pair of cylinders aforesaid, a receptacle beneath said first pair of cylinders aforesaid, and dust jets arranged below said cylinders in the proximity of the said receptacle, substantially as described.

2. A molding machine, consisting of two cylinders B, two cylinders A above said cylinders B, all of said cylinders mounted on a frame and parallel with one another, a hopper H, mounted above said cylinders, a deflector F in said hopper, scrapers J in said hopper, lubricating jets G arranged on said hopper above said first pair of cylinders, depressions concurrent with said depressions L, a receptacle or conveyer D below said first pair of cylinders and dust jets E arranged below said cylinders B in the proximity of said receptacle D, substantially as described.

In witness whereof I have hereunto set my hand this 21st day of February, 1907.

WILLIAM D. CROW.

In the presence of—
F. B. Roy,
Clarence G. Galston.